United States Patent [19]
Grunert et al.

[11] 3,901,263
[45] Aug. 26, 1975

[54] REGULATING VALVE FOR FUEL METERING DEVICE, ESPECIALLY FOR THE COMBUSTION CHAMBER OF AN AEROJET ENGINE

[75] Inventors: Wilhelm Grunert, Dammarie-les-Lys; Claude Gustave Gaudas, Draveil, both of France

[73] Assignee: Societe Nationale d'Etude et de Construction de Moteurs d'Aviation, Paris, France

[22] Filed: Apr. 17, 1973

[21] Appl. No.: 351,845

[30] Foreign Application Priority Data
Apr. 18, 1972  France .............................. 72.13606

[52] U.S. Cl. .................................. 137/117; 251/43
[51] Int. Cl. .......................................... G05d 11/02
[58] Field of Search .......... 251/41, 43, 33, 61, 61.2; 137/82, 489.5, 117

[56] References Cited
UNITED STATES PATENTS
| | | | |
|---|---|---|---|
| 895,342 | 8/1908 | Collin | 251/43 X |
| 1,925,301 | 9/1933 | Campbell | 251/43 X |
| 3,179,293 | 4/1965 | Ensign | 251/41 X |
| 3,799,498 | 3/1974 | Wickham | 137/82 X |

FOREIGN PATENTS OR APPLICATIONS
462,346  1/1950  Canada ................................ 251/61

*Primary Examiner*—Arnold Rosenthal
*Attorney, Agent, or Firm*—William J. Daniel

[57] ABSTRACT

A regulating valve comprises an obturator which moves axially so as to control the cross-sectional area of a passage connecting a return duct with a ducting system supplying a metering device with fuel under pressure and containing or liable to contain solid impurities. The obturator is a hollow needle slidably mounted on a shaft and operated by a bellows which is immersed externally in the fuel and has its interior in communication with the inside cavity of the needle and exposed to the pressure of a control fluid consisting of filtered fuel.

7 Claims, 1 Drawing Figure

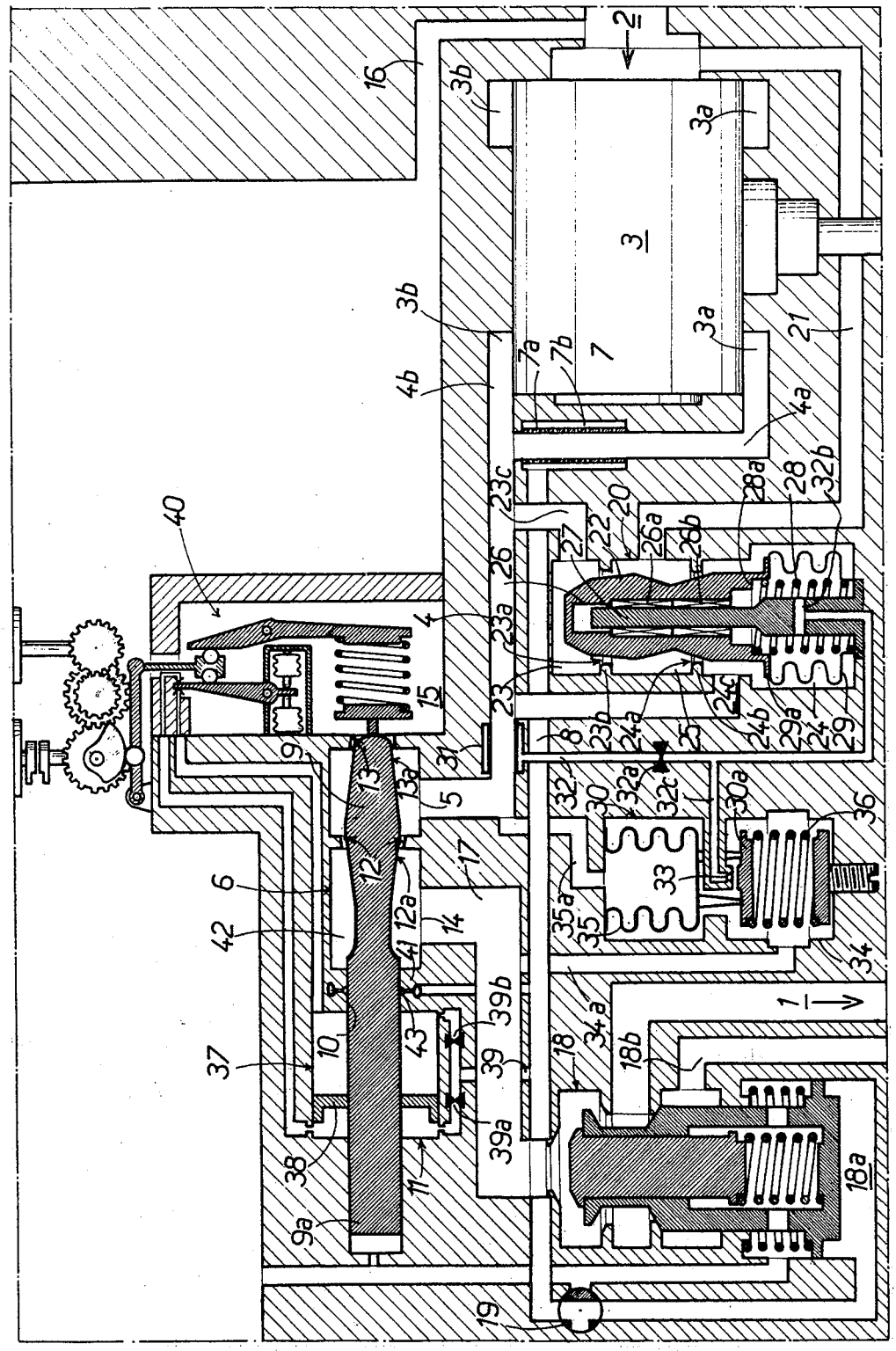

REGULATING VALVE FOR FUEL METERING DEVICE, ESPECIALLY FOR THE COMBUSTION CHAMBER OF AN AEROJET ENGINE

The invention relates to the metering of a fuel flow, supplying for example, the combustion chamber of an aerojet engine. It concerns more precisely a regulating valve intended to be associated with a metering device so as to by-pass towards a return duct part of the fuel delivered by a pump to the metering device in order to maintain its pressure at the desired level in relation to the pressure of the fuel downstream of the metering device.

Regulating valves generally comprise a sliding piston which is in contact with fuel bled upstream of the metering device and which is operated by the pressure of this fuel to open and close a passage to the return ducting system. The fuel delivered by the pump is often polluted, i.e. often contains solid impurities such as particles of metal, and known regulating valves have the drawback of comprising sliding surfaces which risk becoming clogged or even jammed by these impurities.

The present invention eliminates this drawback by causing the sliding surfaces to be bathed in filtered fuel.

According to the invention, the cross-sectional area to the return is controlled to this end by a hollow needle slidably mounted on a shaft and operated by a bellows which is bathed externally in polluted fuel and has its interior in free communication with the internal cavity of the needle, and exposed in use to the pressure of a control fluid constituted by filtered fuel.

The filtered fuel thus bathes the sliding surfaces of the needle and the shaft in such a manner that the latter does not risk being jammed by the impurities which may be found in the unfiltered fuel, the by-passed return flow of which is controlled by the needle.

The description which follows with reference to the accompanying drawing is given by way of a non-limitative example, and explains how the invention can be put into effect. All features which emerge both from the text and from the drawing are to be considered as falling within the scope of the invention. The drawing is a partial sectional view of an aero-turbojet engine fuel control unit comprising a regulating valve in accordance with the invention.

The fuel control unit, part of which is shown in the drawing, is intended to control the supply flow in a duct 1 linked to the injectors, not illustrated, of the combustion chamber of the jet engine, of fuel bled at 2 by the fuel pump 3.

The polluted fuel, i.e. containing or liable to contain solid impurities, is bled at 2 by the fuel pump 3, which is of the vane type and is therefore functionally unimpaired by impurities. The pump delivers the fuel via inlets 3a, 3b to two ducts 4a, 4b flowing into a ducting system 4 terminating at the inlet 5 to a metering device, which is designated as a whole by the reference 6. The delivery duct 4a comprises a section the wall of which consists of a porous sleeve 7a and which is enclosed in a chamber 7b forming, together with the sleeve 7a, a filter 7 according to the invention. From the chamber 7b exits a duct 8 which thus receives fuel from the duct 4a through the sleeve 7a and consequently filtered, and which supplies devices which will be described later. These devices consume a very small amount of fuel; moreover, the filtering sleeve 7a does not risk becoming clogged since, as has already been stated, its entry surface is permanently washed by the fuel circulating at a high rate in the duct 4a, so that the pressure loss undergone by the fuel when passing through the filter is negligable and the pressure obtaining in the duct 8 is almost equal to the pressure in the channel 4.

The metering device 6 comprises a needle 9 provided with a cylindrical shaft 9a which slides in a bore 10 under the action of a control device 11, which will be briefly described later on, in such a way as to modify in opposite direction the cross sectional areas of two apertures 12 and 13 respectively providing communication between the inlet 5 of the metering device and its outlet 14 and with a chamber 15 which communicates with a return fuel channel 16 which by-passes the pump 3. The outlet 14 of the metering device opens into a duct 17 which can be made to communicate with the duct 1 in order to supply the injectors by a poppet valve device, represented as a whole by the reference 18, which does not form part of the present invention. The opening and closing of this poppet valve device 18 can be controlled manually by means of a three-way cock 19 which allows a control chamber 18a of this device to communicate with either the duct 8 or the chamber 15. Closing of this poppet valve device places the duct 1 in communication with a drain duct 18b.

The ducting system 4 supplying the metering device 6 from the pump 3 is also linked by a regulating valve or obdurator 20 to a fuel return duct 21 which by-passes the pump. This regulating valve 20 more or less opens communication between the ducting system 4 and the duct 21 in such a way as to maintain constant the pressure differential $\Delta p$ between the inlet 5 and the outlet 14 of metering device 6.

The regulating valve 20 is arranged according to the invention. It comprises a needle 22 moving axially within a cavity forming two inlet chambers 23, 24 on either side of a central outlet chamber 25 with which they can be made to communicate, respectively, by two annular apertures 23a, 24a contained between the needle and two circular seats 23b, 24b. The needle is provided with a blind axial bore 26 containing bearings 26a, 26b by which it is slidably mounted on a shaft 27 fixed at the bottom of the chamber 24. The inlet of the bore 26 is counterbored in steps so as to form a shoulder 28a against which bears a spring 28 which rests on the bottom of the chamber 24, and it is provided with a flange 29a to which is welded one end of a bellows 29 of which the other end is secured in a sealed manner to the bottom of the chamber 24. The two inlet chambers 23, 24 are linked to the ducting system 4, respectively by ducts 23c and 24c, and the outlet chamber 25 is linked with the return duct 21. The external surface portions of the needle 22 which respectively cooperate with the seats 23b and 24b are truncated cones, the major bases of which are in the direction of the bellows 29, so that by making the needle slide in the direction of the bellows, the cross sectional area of the two annular apertures 23a and 24a is enlarged and consequently the amount of fuel flowing from the ducting system 4 into the return duct 21 is increased. Conversely, displacing the needle in the opposite direction progressively reduces this quantity to nil.

The displacement of needle 22 is controlled by filtered fuel filling the bore 26 and the interior of the bellows 29, the pressure of which is modulated by an apparatus 30 called a $\Delta p$ (or pressure differential) detector. The fuel is bled from the ducting system 4 through a filter 31 analogous to the filter 7 by a duct 32 comprising, below a restrictor 32a, passage 32b which opens through the shaft 27 into the bellows 29 and a branching 32c which ends at a nozzle 33 opening into the detector 30 facing a throttling member 30a. The detector comprises a chamber 34 in which throttling member 30a moves axially under the joint effect of a bellows 35 and a spring 36. The interior of the bellows 35 communicates with the ducting system 4 by a duct 35a, whilst the area of the cavity 34 located outside this bellows communicates by a duct 34a with the duct 17 where controlled fuel is flowing downstream of the metering device 6. The nozzle 33 thus forms with the throttling member 30a an escape device the principle of which is well known and which modulates according to $\Delta p$ the pressure of filtered fuel in the duct 32 downstream of the restrictor 32a. This modulated pressure, applied through the passage 32b in the bellows 29 of the regulating valve 20, acts on the needle 22 in the same direction as the spring 28 and in opposition to the inlet pressure of the fuel acting on the needle 22. If $\Delta p$ increases, the throttling member 30a moves away from the nozzle 33 and thus causes a reduction in the modulated pressure acting in the bellows 29, so that the needle 22 is displaced in the direction of this bellows and increases the cross-sectional area of the apertures 23a and 24a; the escape of fuel from the ducting system 4 towards the return duct 21 therefore increases, so that the pressure in the ducting system 4 falls and equilibrium is re-established.

It should be noted that the filtered fuel which fills the interior of the needle 22 and of the bellows 29 is not in contact with polluted, i.e., unfiltered, fuel, so that the displacement of the needle takes place without risk of jamming and with the filtered fuel lubricating the bearings 26a, 26b which ensures a frictionless movement. The filter 31, the same as the filter 7 and for the same reason, does not run the risk of getting clogged and thus disturbing the modulated pressure which operates the regulating valve.

The two seats 23b, 24b have the same diameter and the shape of the truncated conical surface of needle 22 with which they work can easily be calculated in order that the reactions brought about by the two flows from chambers 23, 24 towards central chamber 25 may compensate for one another.

The fuel control unit described functions as a whole in the following way. The poppet valve device 18 is opened when the engine is started and is closed only when it is stopped; it stays open throughout the period of operation and the metering device 6 regulates the flow of fuel which is supplied to the injectors, not illustrated, through ducts 17 and 1. The active part of the needle 9 comprises two portions with the surface inclined in opposite directions 12a, 13a, having approximately the shape of two truncated cones joined side by side at their large base, which regulate respectively the cross sectional areas of the annular aperture 12 allowing passage to the metered flow and of the annular passage 13 through which the surplus flow entering the metering device at 5 is discharged into cavity 15 and from there into the return duct 16. As the pressure differential $\Delta p$ undergone by the fuel when passing through the regulating annular aperture 12 is kept constant by the regulating valve 20, the flow passing through this aperture 12 is maintained proportional to the cross sectional area of the latter.

The control device 11 of the metering device comprises a cylinder 37 in which slides a piston 38 integral with a shaft 9a of the needle 9. A by-pass 39 of the filtered fuel duct 8 feeds, respectively through throttles 39a and 39b, the two chambers of the cylinder separated by the piston 38. The pressures in these two chambers are modulated, according to the various regulation parameters of the engine, by an apparatus 40 called a force balance, which does not form part of the invention and need not be described in detail.

The bore 10, which guides the cylindrical shaft 9a of the needle 9 during its sliding movement, is made through a partition 41 separating the cylinder 37 from a chamber 42 which receives the metered fuel through the aperture 12 and discharges it through the outlet 14. In this partition 41 there is an annular groove 43 communicating with duct 8. As stated earlier, the pressure of thhe filtered fuel in the duct 8 is almost equal to the pressure of the ducting system 4, which is higher by the quantity $\Delta p$ than the pressure of the chamber 42. The filtered fuel therefore tends to flow from the annular grove 43 towards the chamber 42 and prevents the impurities contained in the unfiltered fuel circulating in this chamber from penetrating into the gap between the shaft 9a and the bore 10, so that there is no risk of this shaft jamming in this bore. Neither is there a risk of piston 38 jamming, since the fuel filling the cylinder 37 is filtered.

We claim:

1. In a system for controlling a flow of unfiltered fuel containing or liable to contain solid impurities, comprising a flow-metering device, intake ducting means leading to said metering device, and fuel feeding means for supplying said intake ducting means with said unfiltered fuel under pressure and output ducting means for delivering said fuel from said metering device; a regulating valve for by-passing part of said unfiltered fuel from said intake ducting means to a fuel return duct to control said intake pressure and comprising a valve housing having inlet and outlet chambers and means defining an orifice therebetween, piping means for delivering unfiltered fuel from said intake ducting means to said inlet chamber and from said outlet chamber to said fuel return duct, a throttling needle having an internal cavity therein and a tapering outer surface and extending in said inlet and outlet chambers through said orifice to devine an annular passage therebetween, a stationary shaft coaxial with the needle and projecting within the internal cavity in said needle, guiding means in the internal cavity to guide the needle for axial movement along the shaft, pressure-deformable partition means around said shaft, connecting the needle to said valve housing and defining therein a control chamber including said internal cavity, and control means comprising means for supplying the control chamber with filtered fuel whereby said needle guiding means are bathed in and lubricated by filtered fuel, and means responsive to the pressure differential between said intake ducting means and said output ducting means for modulating the pressure of said filtered fuel in order to control the axial position of the needle on said shaft.

2. A regulating valve as claimed in claim 1 in which the internal cavity of the needed is a blind bore.

3. A control system as claimed in claim 1, in which said control means comprise duct means connecting the intake ducting means to the control chamber, a filter in the duct means, a restriction in the duct means between the filter and the control chamber, and an escape device for controlling a leakage of filtered fuel downstream of the restriction, in response to the pressure differential.

4. A control system as claimed in claim 1 in which the deformable partition means comprise a bellows arranged around the shaft and having one end fixed to the needle and one end fixed to the valve housing.

5. In a system for controlling a flow of fuel, comprising a metering device, feed ducting means, and means for supplying the feed ducting means with unfiltered fuel containing or liable to contain solid impurities, to feed the unfiltered fuel to the metering device; in combination a regulating valve for by-passing part of said unfiltered fuel from the feed ducting means to a fuel return duct and comprising a valve housing, a valve seat in said valve housing, piping means for connecting the valve seat between the feed ducting means and the return duct to supply the valve seat and return duct with a by-pass flow of unfiltered fuel, a needle having an internal cavity therein and projecting through the valve seat to define a passage therebetween a stationary shaft coaxial with the needle and projecting within the internal cavity, guiding means in the internal cavity to guide the needle for axial movement along the shaft, the external surface of said needle being shaped in relation to said valve seat to vary the cross-sectional area of the passage when said needle is moved axially, pressure-deformable partition means around the shaft, connecting the needle to the valve housing and defining therein a control chamber including said internal cavity, and control means comprising means for supplying the control chamber with filtered fuel, and means for modulating the pressure of the filtered fuel in order to control the axial position of the needle on said shaft, said regulating valve further comprising a further valve seat formed in the valve housing around the needle to define therewith a further passage, an outlet chamber formed in the valve housing between the valve seat and the further valve seat, and a pair of inlet chambers formed in the valve housing on either side of the valve seat and further valve seat respectively, and in which said piping means comprise means connecting both inlet chambers to the feed ducting means, and means connecting the outlet chamber to the return duct.

6. A control system as claimed in claim 5 in which the needle has axially spaced external surface portions which define said passage and a further passage in cooperation with the valve seat and the further valve seat respectively, both said surface portions tapering in a same direction.

7. A control system as claimed in claim 6 in which the valve seat and the further valve seat have equal diameters.

* * * * *

UNITED STATES PATENT OFFICE
CERTIFICATE OF CORRECTION

PATENT NO. : 3,901,263
DATED : August 26, 1975
INVENTOR(S) : Wilhelm GRUNERT et al It is certified that error appears in the above–identified patent and that said Letters Patent are hereby corrected as shown below:

In the claims:

Column 4, line 47, change "devine" to -- define --.

line 63, change "regulating valve" to -- control system --.

line 64, change "needed" to -- needle --.

Column 5, line line 23, insert -- , -- after "therebetween".

Signed and Sealed this twenty-eight Day of October 1975

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,901,263
DATED : August 26, 1975
INVENTOR(S) : Wilhelm Grunert et al It is certified that error appears in the above-identified patent and that said Letters Patent are hereby corrected as shown below:

In the title, change it to read -- REGULATING VALVE FOR FUEL METERING DEVICE, ESPECIALLY FOR THE COMBUSTION CHAMBER OF AN AIRCRAFT JET ENGINE --.

Column 1, line 7, change "aerojet engine" to -- aircraft jet engine --.

Column 1, line 43, change "aero-turbojet engine" to -- aircraft turbojet engine --.

Signed and Sealed this

Thirtieth Day of November 1976

[SEAL]

Attest:

RUTH C. MASON
*Attesting Officer*

C. MARSHALL DANN
*Commissioner of Patents and Trademarks*